United States Patent [19]

Gante et al.

[11] 3,864,117

[45] Feb. 4, 1975

[54] HERBICIDAL AGENTS

[75] Inventors: Joachim Gante; Gerhart Schneider, both of Darmstadt, Germany

[73] Assignee: Merck Patent Gesellschaft mit beschrankter Haftung, Darmstadt, Germany

[22] Filed: June 25, 1971

[21] Appl. No.: 156,957

[30] Foreign Application Priority Data
June 27, 1970 Germany............................ 2031942

[52] U.S. Cl............................. 71/115, 71/88, 71/90, 71/93, 71/100, 71/104, 71/107, 71/108, 71/109, 71/110, 71/116, 71/117, 71/118, 260/347.2, 260/347.3, 260/347.4, 260/476, 260/515

[51] Int. Cl.............................................. A01n 9/24

[58] Field of Search........... 71/115, 107, 88, 90, 93, 71/100, 104, 108, 118

[56] References Cited
UNITED STATES PATENTS

| | | | |
|---|---|---|---|
| 2,394,916 | 2/1946 | Jones | 71/114 |
| 3,183,075 | 5/1965 | Walworth | 71/115 |
| 3,472,646 | 10/1969 | Eue et al | 71/115 |

FOREIGN PATENTS OR APPLICATIONS

| | | | |
|---|---|---|---|
| 7,102,436 | 9/1971 | Netherlands | 71/115 |

*Primary Examiner*—James O. Thomas, Jr.
*Attorney, Agent, or Firm*—Millen, Raptes & White

[57] ABSTRACT

Compounds of the formula

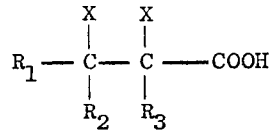

and derivatives thereof, including esters, thioesters, and ammonium and metal salts thereof, wherein $R_1$ is aryl, unsubstituted 2-furyl or 2-furyl substituted at the 5-position by halogen or $NO_2$; $R_2$ and $R_3$ are H or $CH_3$ and X is Cl or Br, are selective defoliating herbicides useful to control weeds in agriculture and horticulture, e.g., cultivation of corn, rice and cotton.

8 Claims, No Drawings

HERBICIDAL AGENTS

BACKGROUND OF THE INVENTION

This invention relates to dihalogenated propionic acid derivatives, intermediates in the production thereof and the use thereof as herbicides.

SUMMARY OF THE INVENTION

Good herbicidal activity is exhibited by propionic acid derivatives of Formula I

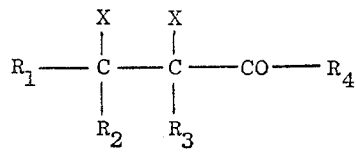

wherein X is chlorine or bromine; $R_1$ is Ar or unsubstituted 2-furyl or 2-furyl substituted in the 5-position by halogen or $NO_2$; $R_2$ and $R_3$, which are identical or different, are hydrogen or methyl; and $R_4$ is OH, O-alkyl, O—Ar, O—Ar, O—Me, $NH_2$, NH-alkyl, N-dialkyl, NH—Ar, S-alkyl, S—Ar, S—CN, or S—$CH_2$—CO—O-alkyl.

DETAILED DISCUSSION

In the above formula, the alkyl groups can contain 1–18 carbon atoms and optionally are substituted in the hydrocarbon chain by OH; Ar is phenyl or phenyl mono- or di-substituted by halogen, $NO_2$ or alkyl or alkoxy of up to 4 carbon atoms; and Me is an alkali metal cation, an optionally substituted ammonium cation, or an equivalent of an alkaline earth metal cation or heavy metal cation. Especially preferred are compounds wherein $R_4$ is hydroxy, alkoxy, phenoxy, and O—Me.

The above-described propionic acid derivatives exhibit leaf-herbicidal activity against a number of difficult-to-combat grasses in grain, truck crop, and other field and vegetable cultures. At the same time, they are compatible to a surprisingly high degree with the corresponding cultivated plants. Because of an ever-increasing grass infestation of cultivated areas, the compounds of Formula I are particularly valuable herbicides which can be employed in cultivated areas to ensure maximum yields in agriculture and horticulture.

The herbicidal agents of this invention contain as an active ingredient an effective concentration of at least one compound of Formula I.

This invention also relates to the novel compounds defined by Formula I. These compounds are furan substituted propionic acid derivatives of Formula Ia

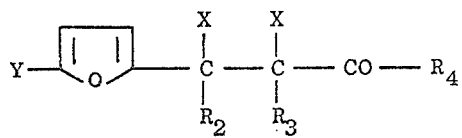

wherein Y is H, halogen or $NO_2$, and X, $R_2$, $R_3$, and $R_4$ have the values given in Formula I. This invention also relates to processes and intermediates for the preparation thereof.

In the compounds of Formula I, $R_1$ is aryl or 2-furyl, 5-fluoro-2-furyl, 5-chloro-2-furyl, 5-bromo-2-furyl, 5-iodo-2-furyl or 5-nitro-2-furyl. Preferred of the compounds wherein $R_1$ is furyl are those of Formula Ia wherein Y is H, Cl, Br or $NO_2$. Examples of compounds of Formula I wherein $R_1$ is aryl are those wherein $R_1$ is phenyl, 2-, 3-, or 4-chlorophenyl, 2-, 3-, or 4-bromophenyl, 2-, 3-, or 4-nitrophenyl, 2-, 3-, or 4-methyl- or -ethylphenyl, 2-, 3-, or 4-methoxy- or -ethoxyphenyl, 4-isopropylphenyl, 2-chloro-4-methylphenyl, 2-bromo-3-methoxy-5-methylphenyl, 2,4-, 2,6-, or 3,4-dichlorophenyl, 3,5-dinitrophenyl, 3-methyl-4-chlorophenyl, 3-bromo-4-methoxyphenyl, 3,4-dimethylphenyl, 3,4-dimethoxyphenyl, and 2-methoxy-4-chlorophenyl. Preferred compounds of Formula I are those wherein $R_1$ is phenyl or phenyl mono- or di-substituted in the 3- and/or 4-position by chlorine.

$R_2$ and $R_3$ of the herbicidal agents of this invention are hydrogen or methyl. Thus, the effective agents are derivatives of propionic acid, of butyric acid, of isobutyric acid, or of methylethylacetic acid. The compounds derived from propionic acid are preferred, i.e., compounds of Formula I wherein $R_2$ and $R_3$ both are hydrogen.

The substituents X in Formula I, which can be identical or different, each is a chlorine or bromine atom. The compounds of Formula I wherein the two substituents X are identical are particularly simple to produce and are thus preferred. These compounds are obtained by reacting the corresponding unsaturated acids or acid derivatives with the selected halogen.

Compounds which exhibit particularly good herbicidal effects are α,β-dichloropropionic acid derivatives of Formulae Ib and Ic:

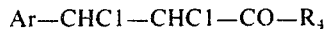

(Ib)

(Ic)

wherein Ar and $R_4$ have the values given above.

Depending on $R_4$, the active substances of the herbicidal agents of this invention are carboxylic acids, carboxylic acid esters and thioesters, carboxylic acid salts, carboxylic acid thiocyanates, or carboxylic acid amides. Suitable esters are all those of straight-chain and branched alkanols containing up to 18, preferably 1 to 10, carbon atoms and of phenols of the formula Ar-OH wherein Ar is aryl as defined herein. Preferred are the alkyl esters of preferably unbranched alkanols containing up to 10 carbon atoms, phenyl esters, and phenyl esters mono- or di-substituted on the phenyl ring by halogen, lower alkyl and/or lower alkoxy (1–4 carbon atoms), particularly those substituted by chlorine, methyl and/or methoxy.

Among the carboxylic acid thioesters of Formula I, of primary importance are those derived from alkyl mercaptans $R_5SH$, thiophenol, and thioglycolic acid esters of the formula HS—$CH_2$—$COOR_5$ wherein $R_5$ is alkyl of 1–6 carbon atoms, preferably methyl or ethyl.

Carboxylic acid esters and thioesters of Formula I with a good herbicidal effect which can be produced in an especially economical manner are the α,β-dichloro-β-phenylpropionic acid esters of methanol, ethanol, propanol, butanol, pentanol, hexanol, phenol, thiophenol, methyl and ethyl mercaptan, as well as of the methyl or ethyl ester of thioglycolic acid.

Examples of carboxylic acid salts of Formula I are ammonium salts, substituted ammonium salts of aliphatic or cycloaliphatic amines containing 1–18 carbon atoms wherein the hydrocarbon chain or chains thereof are optionally substituted by OH-groups, salts with N-heterocyclics, alkali metal salts, alkaline earth metal salts, and heavy metal salts.

The aliphatic or cycloaliphatic amines can be primary, secondary, or tertiary amines. The hydrocarbon chain or chains can be substituted by up to a total of 4 OH-groups. The individual hydrocarbon chains can be linear or branched and can be mono-, double-, or triple-unsaturated, preferably with C—C double bonds.

Of particular importance among the salts of amines are salts of primary amines with longer-chain tertiary alkyl or alkenyl groups, wherein the tertiary carbon atom is preferably vicinal to the nitrogen atom. Mixtures of such amines are commercially available under the name of "Primenes" (Rohm & Haas Co.).

Examples of amines suitable for forming salts are mono-, di-, and triethylamine; mono-, di-, and tripropylamine and the isomers thereof with branched chains; mono-, di-, and tri-butylamine and the isomers thereof with branched chains, in particular N-tert.-butylamine and isobutylamine; di(2-ethylhexyl)amine; n- or tert.-octylamine; N,N'-bis(tert.-octyl)amine; decyl- and isodecylamine (especially dimethyloctylamine); dodecylamine, particularly tert.-dodecylamine; $C_9H_{19}$—$C(CH_3)_2$—$NH_2$; $C_{10}H_{21}$—$C(CH_3)_2$—$NH_2$; $C_{11}H_{23}$—$C(CH_3)_2$—$NH_2$.

Other amines which are of special importance for the formation of amine salts of Formula I are, for example, mono-, di-, and triethanolamine; mono-, di-, and tri(hydroxypropyl)-amine or mono-, di-, and tri(hydroxybutyl)amine, wherein the OH-groups can, in each case, be in the $\alpha$-, $\beta$-, or $\gamma$-position. "Decamine" (Diamond Alkali Co.) and coconut oil amine can also be used. The term "coconut oil amine" means a mixture of preferably primary amines, the saturated hydrocarbon chains of which contain 6–18 carbon atoms.

As examples of cycloaliphatic amines, cyclohexylamine and cyclopentylamine are preferably employed.

Of special importance, of course, are the amines which are economical and readily obtainable on a technical scale. In many cases, it is advantageous to employ mixtures of amines rather than a single amine, since some amines, particularly the longer-chain amines, are available commercially in many instances in the form of mixtures. Also isomeric amines are often not separated but rather are sold as mixtures and can be employed in this form for producing the herbicidal agents of this invention.

Examples of N-heterocyclic amines the salts of which with the acids of Formula I are important as herbicidal agents of this invention are piperidine, pyridine, pyrrolidine and morpholine and alkylated derivatives thereof.

Of the compounds of Formula I wherein $R_4$ is Me and Me is a metallic cation or an equivalent of such a cation, the sodium, potassium, magnesium, calcium, copper, zinc, manganese and iron salts are particularly suitable.

Finally, of the carboxylic acid amides, i.e., compounds of Formula I wherein $R_4$ is $NH_2$, NH-alkyl, N-dialkyl or NH—Ar, important amides are those, in particular, which are monosubstituted or Di-substituted by alkyl groups on the nitrogen, i.e., amides of the above-mentioned primary and secondary amines. Examples of such amides are N,N-dimethyl amides, anilides, ethyl amides, 2-hydroxyethyl amides, butyl amides, hexyl amides, dodecyl amides and stearyl amides. It is, of course, also possible to utilize mixtures of amides of Formula I, obtainable, for example, from the corresponding carboxylic acids and from the above-mentioned commercial amine mixtures, as the effective substances of the herbicidal agents of this invention.

The herbicidal effect of the effective compounds of the agents of the present invention was examined in tests on several of the most troublesome grass types in grain cultures and other field cultures. For this purpose, the effective substances to be tested were dissolved in acetone, mixed with a commercially available emulsifier, and brought to the concentrations set forth herein with water. The test plants on a turntable were sprayed with the solutions of effective agent with a spray gun until dripping wet. After the test plants had remained in the greenhouse for 3 weeks, the condition of the test plants was evaluated.

In Table I are compiled the concentrations (in %) of the effective compounds of the invention at which at least 60% of the test plants were killed entirely and the remainder were almost killed or damaged to such an extent as to be regarded as being destroyed.

TABLE I

Effect of Compounds of Formula I on Undesired Grasses

| Effective Compound | Wild Oat (1–2 Leaves) | Wild Oat (2–3 Leaves) | Meadow Foxtail (1–2 Leaves) | Silky Bent Grass (1–2 Leaves) | Digitaria sang. (2 Leaves) | Sorghum halepense (1–2 Leaves) |
|---|---|---|---|---|---|---|
| $\alpha,\beta$-Dichloro-$\beta$-phenylpropionic acid | 0.04 | 0.1 | 0.4–0.2 | 0.4 | 0.4 | 0.4 |
| $\alpha,\beta$-Dichloro-$\beta$-phenylpropionic acid methyl ester | 0.04 | 0.2–0.1 | — | — | — | — |
| $\alpha,\beta$-Dichloro-$\beta$-phenylpropionic acid ethyl ester | 0.1 | 0.1 | — | — | — | — |
| $\alpha,\beta$-Dichloro-$\beta$-phenylpropionic acid hexyl ester | 0.04 | 0.1 | — | — | — | — |
| $\alpha,\beta$-Dichloro-$\beta$-phenylpropionic acid phenyl ester | 0.04 | 0.1 | — | — | — | — |
| $\alpha,\beta$-Dichloro-$\beta$-phenylpropionic acid ammonium salt | 0.1 | 0.1 | — | — | — | — |

In a comparative test under the above-described conditions, a compound known to be a grass herbicide was used, i.e., the 4-chlorobutyn-(2)-yl ester of m-chlorocarbanilic acid (m-chlorophenylcarbamic acid). It was found that although this ester caused a strong inhibition in the test plants in concentrations from 0.4 to 0.04%, the compound did not kill the plants.

An equally high effect as the compounds listed in Table I is also exhibited by the following compounds:
isopropyl ester of $\alpha$, $\beta$-dichloro-$\beta$-phenylpropionic acid;
amyl ester of $\alpha$, $\beta$-dichloro-$\beta$-phenylpropionic acid;
octyl ester of $\alpha$, $\beta$-dichloro-$\beta$-phenylpropionic acid;
sodium salt of $\alpha$, $\beta$-dichloro-$\beta$-phenylpropionic acid;
diethanolammonium salt of $\alpha$, $\beta$-dichloro-$\beta$-phenylpropionic acid;
cyclohexylammonium salt of $\alpha$, $\beta$-dichloro-$\beta$-phenylpropionic acid;
$\alpha$, $\beta$-dichloro-$\beta$-(4-chlorophenyl)-propionic acid;
ammonium salt of $\alpha$, $\beta$-dichloro-$\beta$-(4-chlorophenyl)-propionic acid;
diethanolammonium salt of $\alpha$, $\beta$-dichloro-$\beta$-(4-chlorophenyl)-propionic acid;
ammonium salt of $\alpha$, $\beta$-dichloro-$\beta$-(3,4-dichlorophenyl)-propionic acid; and
sodium salt of $\alpha$, $\beta$-dichloro-$\beta$-(3,4-dichlorophenyl)-propionic acid.

In additional tests, the influence of the effective compounds of this invention and the comparison compound on several important cultivated plants was examined. For this purpose, these plants were treated with the preparations of effective agents in the same manner as described above for the undesired grasses. The evaluation was conducted 3 weeks after spraying. Table II contains in column A the lowest killing concentration (in percent by weight) (0.4% being the highest test concentration) and in column B the lowest concentration which still led to an inhibition of the cultivated plants. In this connection, the degree of inhibition is indicated in a five-value scale (H1 to H5) wherein H1 means a very slight, temporary inhibition and H5 represents a strong, lasting inhibition.

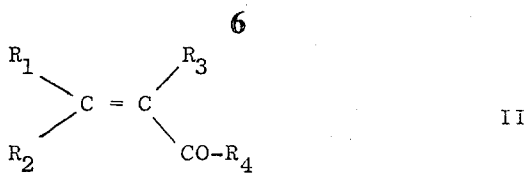

wherein $R_1$, $R_2$, $R_3$ and $R_4$ have the values given for Formula I, with chlorine or bromine. Preferably, $R_4$ is OH.

This reaction is ordinarily conducted in an organic solvent inert with respect to the halogen employed, e.g., chloroform, carbon tetrachloride, carbon disulfide, dimethylformamide, or glacial acetic acid. The halogenation of compounds of Formula II can also be conducted in an aqueous medium. It is not always absolutely necessary for the starting material and/or the final product to be completely dissolved in the solvent employed. The reaction temperatures ordinarily range between -20° C. and the boiling point of the solvent utilized, preferably +10° C. or above. Occasionally, it is advantageous to irradiate the reaction mixture during the halogenation with visible or ultraviolet light. The reaction time depends essentially on the size of the reacted batch and usually ranges between 15 minutes and 48 hours. The reaction products are isolated in a conventional manner. Insofar as they are insoluble in the solvent employed, they are filtered off. Soluble products can be isolated by distilling off the solvent.

The effective compounds of the herbicidal agents of this invention can also be obtained by substituting one $R_4$ group by a different $R_4$ group in compounds of Formula I. In particular, carboxylic acids of Formula I ($R_4$ = OH) can be converted into the salts ($R_4$ = O—Me)., esters ($R_4$ = O-alkyl -alkyl or O—Ar), thioesters ($R_4$ =S-alkyl, S—Ar or S—Ch$_2$—CO—O-alkyl) or amides or substituted amides ($R_4$ = NH$_2$, NH-alkyl, NH—Ar or N-dialkyl) thereof.

The salts of Formula I are preferably prepared by reacting the carboxylic acids of Formula I with corresponding bases or amines, such as, for example, sodium hydroxide, potassium hydroxide, calcium hydroxide, ammonia, methylamine, dimethylamine, butylamine, or dibutylamine. Heavy metal salts of Formula I are

TABLE II
Effect of Compounds of Formula I on Cultivated Plants

| Cultivated Plant → | Wheat | | Sugar Beet | | Corn | | Rice | | Cotton | |
|---|---|---|---|---|---|---|---|---|---|---|
| Effective Compound ↓ | A | B | A | B | A | B | A | B | A | B |
| $\alpha,\beta$-Dichloro-$\beta$-phenylpropionic acid | > 0.4 | 0.4/H4 | 0.4 | 0.2/H4 | > 0.4 | 0.4/H3 | > 0.4 | 0.4/H3 | 0.4 | 0.2/H4 |
| Methyl ester of $\alpha,\beta$-di-chloro-$\beta$-phenylpropionic acid | > 0.4 | 0.4/H3 | > 0.4 | 0.4/H2 | > 0.4 | no inhibition | > 0.4 | no inhibition | > 0.4 | no inhibition |
| Control: 4-Chlorobutyn-(2)-yl ester of m-chlorocarbanilic acid | > 0.4 | 0.2/H5-H4 | > 0.4 | 0.1/H4 | 0.4 | 0.04/H4 | 0.4-0.1 | 0.1/H5 | > 0.4 | 0.1/H5-H4 |

It can be clearly seen from this table that the effective compounds of the agents of this invention are tolerated more satisfactorily by the cultivated plants than the control, i.e., the reference comound.

Some of the compounds of Formula I are known in the literature. The novel compounds can be prepared analogously to the conventional compounds. A preferred method is reacting the unsaturated compounds of Formula II preferably obtained by double reaction of an alkali metal salt of Formula I with a suitable heavy metal salt, e.g., zinc acetate, copper acetate, iron (II) sulfate, or manganese (II) chloride. When heavy metal salts of strong acids are employed, e.g., sulfates or chlorides, it is advantageous to add a buffer salt to the reaction mixture, e.g., sodium acetate. The reaction of acids of Formula I with bases or amines is advantageously conducted in a solvent in the presence of an acid-base indicator. The end point of the reaction can, of course, also be determined in some other manner, e.g., with a pH measuring device.

The esterification of carboxylic acids of Formula I is preferably effected by reaction with the corresponding alcohol in the presence of a catalytic amount of a suitable acid, for example hydrochloric acid or sulfuric acid. However, the acid can first be converted into a reactive acid derivative, preferably a halogenide, particularly the acid chloride, and this product thereafter reacted with the alcohol corresponding to the desired ester group or preferably with an alcoholate thereof, especially the alkali metal alcoholate. In this way, in particular, the aryl esters ($R_4 = O-Ar$) and the thioesters ($R_4 = S$-alkyl, S—Ar, S—$CH_2$—CO—O—-alkyl) are produced. In the same manner, the thiocyanates of Formula I are obtained by reacting an acid halogenide with an alkali metal thiocyanate.

The acid amides of Formula I ($R_4 = NH_2$, NH-alkyl, NH—Ar, N-dialkyl) are ordinarily obtained by reacting a reactive acid derivative, preferably an acid halogenide, with ammonia of a primary or secondary amine. It is, of course, likewise possible to convert the acid amides ($R_4 = NH_2$) into the N-substituted derivatives by conventional alkylating or arylating methods, respectively. Furthermore, amides can be produced from the ammonium salts and substituted ammonium salts of Formula I by splitting off water.

The compounds of Formula I can be processed into all forms of application customary for herbicidal agents. Thus, the effective compounds can be utilized in solid or liquid form, in combination with the usual vehicles, fillers, and/or auxiliary agents, as sprayable and/or dusting agents, solutions, or emulsions which can, for example, also be sprayed as aerosols, as well as in the form of dispersions or granulated compositions. Additives which can be employed in this connection are, for example, vehicles or fillers such as bole, kaolin, siliceous chalk (naturally occurring mineral, consisting of kaolinite and quartz), bentonite, ground slate, pyrophyllite, talc, montmorillonite, chalk, dolomite, mica, silicic acid, aluminium or calcium silicate, kieselguhr and ground walnut hulls; wetting agents wherein, depending on the specific use, anionic or cationic or also nonionic surfactants are suitable, including soaps, e.g., sodium laurate; alkyl sulfates or sulfonates, such as sodium dodecyl sulfate or sulfonate; sulfonated and sulfated ethers; sulfonated alkyl fatty acid esters; sulfonated glycol fatty acid esters; quaternary ammonium salts, e.g., trimethylammonium iodide; amines and amides with long aliphatic chains; monoethers of polyglycols with long-chain aliphatic alcohols, e.g., the reaction products of ethylene oxide or polyethylene glycol with higher aliphatic alcohols; monoesters of polyglycols with fatty acids, e.g., oleic acid; monoethers of polyglycols with alkylated phenols; partially esterified polyhydric alcohols, e.g., sorbitan trioleate; partially or completely esterified polyglycol ethers of polyhydric alcohols, e.g., the tristearic acid ester of the polyglycol ether of sorbitan; binders and dispersing agents, e.g., cellulose and the derivatives thereof, e.g., methyl-, ethyl-, hydroxypropyl-, or carboxymethylcellulose, tragacanth, pectins, gum arabic; solvents, e.g., hydrocarbons, including cyclohexane, xylene, solvent naphtha (aromatic hydrocarbon mixtures having boiling points of between 150 and 180°), petroleum, especially petroleum fractions having boiling points of between 80° and 200°, tetrahydronaphthalene, decahydronaphthalene; aliphatic alcohols, e.g., methanol, ethanol, isopropanol, isobutanol, n-butanol, or hexanol; glycol ethers, e.g., methyl glycol, ethyl glycol; ketones, e.g., acetone, methyl ethyl ketone, diethyl ketone, methyl isobutyl ketone, isophorone, cyclohexanone, methylcyclohexanone, dioxane; dimethylformamide, N-methylpyrrolidone; dimethyl sulfoxide; acetonitrile; and mixtures of these solvents. The effective agents can be sold as an emulsion concentrate which, prior to use, is diluted with water in the usual manner. In case agents are employed containing, as the effective substance components, one or more water-soluble compounds, it is, of course, also possible to employ water as the solvent or diluent for the preparation of the concentrate.

The total content of the compound of Formula I in these preparations ranges generally between 1 and 95%, preferably between 20 and 80%. Depending on the desired effect, the climatic conditions, and the type and characteristics of the plants to be treated, the effective agent is applied at a rate of between 0.5 and 50 kg./ha., preferably between 2 and 20 kg./ha. (0.44–44 lbs./acre, preferably 1.8–18 lbs./acre).

The effective substances of Formula I are also suitable for use as combination preparations. In particular, they can be combined with standard herbicides whose effective spectra can be broadened in a desirable manner by this combination. In particular, the compounds of Formula I can also be combined with growth-promoting herbicides and/or with growth-regulating agents or morphoregulators. Preferably, combinations are prepared which contain, in addition to a compound of Formula I, one or more growth-promoting herbicides from the group of the substituted phenoxyalkanecarboxylic acids or the derivatives thereof and/or one or more hydroxybenzonitriles and/or one or more triazines and/or one or more isothiazoles and/or one or more ureas. In such combined preparations, the proportion of the effective agents of this invention in the total content of effective agents ranges normally between 0.5 and 90%, preferably between 10 and 80%.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, temperatures are in degrees centigrade. For the formulation of the preparations, the numerical data are percent by weight.

PREPARATION OF THE ACTIVE COMPOUNDS

EXAMPLE A

A vigorous stream of chlorine is introduced, under agitation and UV irradiation, into a suspension of 500 g. of cinnamic acid in 4 l. of carbon tetrachloride for 5 hours. During this procedure, the cinnamic acid is dissolved, and the temperature rises to about 70°. Thereafter, the reaction mixture is allowed to cool, and the thus-crystallized $\alpha,\beta$-dichloro-$\beta$-phenylpropionic acid is filtered; m.p. 169°–171°.

EXAMPLE B

A 0.3% solution of ammonia in benzene is added dropwise to a solution of 12 g. of $\alpha,\beta$-dichloro-$\beta$-phenylpropionic acid in 500 ml. of benzene until the reaction mixture reacts neutral. After agitating the mixture for one-half hour, the ammonium-α,β-dichloro-β-phenylpropionate is filtered off; m.p. 175°–177°.

Analogously, the following compounds are obtained: n-butylammonium-α,β-dichloro-β-phenylpropionate, m.p. 130° and di-n-butylammonium-α,β-dichloro-β-phenylpropionate, m.p. 70°–72°.

EXAMPLE C

A solution of 20 g. of sodium hydroxide in 200 ml. of methanol is added dropwise to a solution of 15 g. of α,β-dichloro-β-phenylpropionic acid in 150 ml. of methanol until the changing point of phenolphthalein is reached. Thereafter, the solution is evaporated to dryness. The remaining sodium-α,β-dichloro-β-phenylpropionate melts at about 260°, with decomposition.

Analogously, the following two compounds are produced: potassium-α,β-dichloro-β-phenylpropionate and calcium-α,β-dichloro-β-phenylpropionate.

EXAMPLE D

A solution of 5 g. of zinc acetate in 40 ml. of water is added, under agitation, to a solution of 12 g. of sodium-α,β-dichloro-β-phenylpropionate in 75 ml. of water. The thus-precipitated zinc-α,β-dichloro-β-phenylpropionate is filtered and dried; m.p. from 250° (decomposition).

Analogously, copper(II)-α,β-dichloro-β-phenylpropionate is obtained, m.p. from 210° (decomposition).

EXAMPLE E

A solution of 20 g. of α,β-dichloro-β-phenylpropionic acid in 100 ml. of absolute ethanol is saturated with gaseous hydrogen chloride and refluxed to the boiling point for two hours. Then, the reaction mixture is concentrated to about one-half of its original volume, and cooled with ice. The thus-crystallized ethyl ester of α,β-dichloro-β-phenylpropionic acid melts at 25°–30°.

Analogously, the following compounds are obtained: methyl ester of α,β-dichloro-β-phenylpropionic acid, m.p. 101° n-propyl ester of α,β-dichloro-β-phenylpropionic acid n-butyl ester of α,β-dichloro-β-phenylpropionic acid isobutyl ester of α,β-dichloro-β-phenylpropionic acid, b.p.$_{0.2}$ 134°–139° n-amyl ester of α,β-dichloro-β-phenylpropionic acid isoamyl ester of α,β-dichloro-β-phenylpropionic acid, b.p.$_{0.02}$ 150°–155° n-hexyl ester of α,β-dichloro-β-phenylpropionic acid, b.p.$_{0.15}$ 154°–157° n-octyl ester of α,β-dichloro-β-phenylpropionic acid ethoxycarbonylmethyl thioester of α,β-dichloro-β-phenylpropionic acid.

EXAMPLE F 20 g. of α,β-dichloro-β-phenylpropionic acid chloride and 10 g. of sodium phenolate are dissolved in 100 ml. of acetonitrile and agitated for 6 hours at room temperature. Thereafter, the reaction mixture is filtered off from the precipitated sodium chloride and evaporated under reduced pressure. The phenyl ester of α,β-dichloro-β-phenylpropionic acid remains in the form of a yellowish oil which solidifies after allowed to stand for some time and which melts, after recrystallization from petroleum ether, at 55°–60°.

Analogously, the following compounds are obtained: thiophenyl ester of α,β-dichloro-β-phenylpropionic acid and α,β-dichloro-β-phenylpropionic acid thiocyanate.

EXAMPLE G

A solution of 8.6 g. of chlorine in 200 ml. of carbon tetrachloride is added dropwise, under agitation and UV irradiation, to a solution of 13.9 g. of β-2-furylacrylic acid in 20 ml. of dimethylformamide at −20° and during the course of 30 minutes. After stirring the reaction mixture for another 15 minutes at −20°, it is heated to room temperature and the carbon tetrachloride phase is separated. After the solvent has been distilled off under reduced pressure, there remains 9.5 g. of α,β-dichloro-β-(5-chloro-2-furyl)-propionic acid in the form of a non-distillable oil.

EXAMPLE H

To a suspension of 20 g. of β-2-furylacrylic acid in 200 ml. of carbon disulfide, 15 ml. of bromine is added dropwise under agitation and at room temperature, during the course of 2 hours. Thereafter, the reaction mixture is heated for 2 hours at 35° and, after cooling, the thus-crystallized α,β-dibromo-β-(5-bromo-2-furyl)-propionic acid is filtered off; this compound melts at 134°–136° with decomposition after having been recrystallized from benzene.

EXAMPLE I

Chlorine is introduced for one hour into a suspension of 6.2 g. of β-(5-nitro-2-furyl)-acrylic acid in 50 ml. of glacial acetic acid under UV irradiation at 60°. Thereafter, the glacial acetic acid is distilled off under reduced pressure; there remains α,β-dichloro-β-(5-nitro-2-furyl)-propionic acid as a red oil which decomposes while assuming a black color during attempts at distilling this product.

EXAMPLE J

A solution of 10.3 g. of 2,4-dichloroaniline in 80 ml. of chloroform is added dropwise to a solution of 9.5 g. of α,β-dichloro-β-(5-chloro-2-furyl)-propionyl chloride in 30 ml. of chloroform. The reaction mixture is allowed to stand for 1 hour at room temperature and is then washed twice with respectively 50 ml. of water and dried over sodium sulfate. After the chloroform has been distilled off, there remains the α,β-dichloro-β-(5-chloro-2-furyl)-propionic acid 2,4-dichloroanilide as a highly viscous, yellowish oil.

---

PREPARATION OF COMPOSITIONS FOR APPLICATION PURPOSES

EXAMPLE 1

Sprayable powder:
- 75.0 % α,β-Dichloro-β-phenylpropionic acid
- 0.5 % Alkyl naphthalenesulfonate
- 10.0 % Sulfite waste liquor powder
- 14.5 % Kaolin

EXAMPLE 2

Sprayable powder:
- 65 % Ammonium-α,β-dichloro-β-phenylpropionate
- 8 % Oleic acid N-methyltaurine
- 27 % Precipitated calcium silicate

EXAMPLE 3

Emulsion concentrate:
- 50 % α,β-Dichloro-β-phenylpropionic acid n-hexyl ester
- 43 % Solvent naphtha
- 7 % Emulsifier (mixture of alkyl aryl sulfonate and nonylphenol polyglycol ether)

—Continued

PREPARATION OF COMPOSITIONS FOR APPLICATION PURPOSES

EXAMPLE 4
Emulsion concentrate:
- 50 %  α,β-Dichloro-β-phenylpropionic acid ethyl ester
- 10 %  Cyclohexane
- 33 %  Xylene
- 7 %  Emulsifier (mixture of alkyl aryl sulfonate and nonylphenol polyglycol ether)

EXAMPLE 5
Sprayable powder:
- 40 %  α,β-Dichloro-β-phenylpropionic acid phenyl ester
- 50 %  Precipitated silicic acid
- 1 %  Alkyl naphthalenesulfonate
- 9 %  Sulfite waste liquor powder

EXAMPLE 6
Salt formulation:
- 80 %  Sodium-α,β-dichloro-β-phenylpropionate
- 15 %  Ammonim sulfate
- 1 %  Sodium alkyl sulfate
- 4 %  Sulfite waste liquor powder

EXAMPLE 7
Analogously to Example 1, 75% strength sprayable powders are produced containing, as the effective substance of Formula I, one or more of the following compounds:

zinc-α,β-dichloro-β-phenylpropionate
n-butylammonium-α,β-dichloro-β-phenylpropionate
di-n-butylammonium-α,β-dichloro-β-phenylpropionate
dimethylammonium-α,β-dichloro-β-phenylpropionate
α,β-dichloro-β-(4-chlorophenyl)-propionic acid
α,β-dichloro-β-phenylbutyric acid
calcium-α,β-dichloro-β-phenylpropionate

EXAMPLE 8
Analogously to Example 3, 50% strength emulsion concentrates are prepared, containing as the active agents, one or more of the following compounds:

n-propyl ester of α,β-dichloro-β-phenylpropionic acid
n-amyl ester of α,β-dichloro-β-phenylpropionic acid
octyl ester of α,β-dichloro-β-phenylpropionic acid
ethoxycarbonylmethyl thioester of α,β-dichloro-β-phenylpropionic acid
α,β-dichloro-β-(3-methoxyphenyl)-propionic acid, "Primene" salt
hexyl ester of α,β-dichloro-β-2-furylpropionic acid

EXAMPLE 9
Analogously to Example 4, 50% strength emulsion concentrates are produced, containing as the active agents, one or more of the following compounds:

methyl ester of α,β-dichloro-β-phenylpropionic acid
ethyl ester of α,β-dichloro-β-(2,4-dichlorophenyl)-propionic acid
α,β-dichloro-β-phenylpropionic acid thiocyanate
α,β-dichloro-β-phenylpropionic acid n-dodecyl amide
thiophenyl ester of α,β-dichloro-β-phenylpropionic acid

EXAMPLE 10
Sprayable powder:
- 40 %  α,β-Dichloro-β-phenylpropionic acid
- 20 %  3-Chloro-5-isobutyrylamino-4-cyanoisothiazole
- 1 %  Alkyl naphthalenesulfonate
- 12 %  Sulfite waste liquor powder
- 27 %  Bentonite

EXAMPLE 11
Emulsion concentrate:
- 25 %  α,β-Dichloro-β-phenylpropionic acid n-dodecyl amide
- 25 %  2,4-Dichlorophenoxyacetic acid isooctyl ester
- 35 %  Solvent naphtha
- 10 %  Dimethylformamide
- 5 %  Emulsifier (mixture of alkyl aryl sulfonate and nonylphenol polyglycol ether)

EXAMPLE 12
Sprayable powder:
- 35 %  α,β-Dichloro-β-(5-chloro-2-furyl)-propionic acid methyl ester
- 10 %  2-Chloro-4-ethylamino-6-isopropylamino-1,3,5-triazine
- 1 %  Sodium dialkylnaphthalene sulfonate
- 12 %  Sulfite waste liquor powder
- 42 %  Bole

EXAMPLE 13
Emulsion concentrate:
- 33 %  α,β-Dichloro-β-(3-chloro-4-methylphenyl)-propionic acid octyl ester
- 17 %  2-Chloro-9-fluorenol-9-carboxylic acid buten-(2)-yl ester
- 15 %  Dimethyl sulfoxide
- 30 %  Tetrahydronaphthalene
- 2 %  Methylcellulose
- 3 %  Sodium dodecyl sulfonate

EXAMPLE 14
Emulsion concentrate:
- 25 %  α,β-Dichloro-β-phenylpropionic acid n-hexyl ester
- 15 %  2-Methyl-4-chlorophenoxyacetic acid isooctyl ester
- 5 %  9-Fluorenol-9-carboxylic acid n-butyl ester
- 5 %  3,5-Diiodo-4-hydroxybenzonitrile oleylamine salt
- 10 %  Dimethylformamide
- 5 %  Emulsifier (mixture of polyoxyethylene sorbitan ester and sodium alkylaryl sulfonate)
- 35 %  Xylene

EXAMPLE 15
Salt formulation:
- 54 %  α,β-Dichloro-β-phenylpropionic acid "Primene" salt
- 27 %  2,4,5-Trichlorophenoxyacetic acid sodium salt
- 9 %  2-Chloro-9-fluorenol-9-carboxylic acid sodium salt
- 8 %  Sulfite waste liquor powder
- 2 %  Sodium dialkyl naphthalenesulfonate

EXAMPLE 16
- 30 %  α,β-Dichloro-β-phenylpropionic acid phenyl ester
- 18 %  2-Methyl-4-chlorophenoxyacetic acid hexyl ester
- 6 %  2,7-Dichloro-9-fluorenol-9-carboxylic acid butyl ester
- 6 %  3-Chloro-5-trimethylacetylaminoisothiazole-4-carbonitrile
- 5 %  Alkyl naphthalenesulfonate
- 35 %  Solvent naphtha The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of combatting weed grasses which comprises applying thereto a herbicidally effective amount of a composition containing as an essential active ingredient at least one of α,β-dichloro-β-phenylpropionic acid or an alkali-metal or ammonium, salt thereof.

2. A method according to claim 1 wherein the essential active ingredient is sodium α,β-dichloro-β-phenylpropionate.

3. A method according to claim 1 wherein the essential active ingredient is ammonium α,β-dichloro-β-phenyl-propionate.

4. A method according to claim 1 wherein the essential active ingredient is α,β-dichloro-β-phenylpropionic acid.

5. A method according to claim 1 wherein the composition is applied to a cultivated crop area in an amount effective to substantially inhibit weed grass growth but less than that which is substantially phytotoxic to the cultivated crop.

6. A method according to claim 5 wherein the essential active ingredient is sodium $\alpha,\beta$-dichloro-$\beta$-phenyl-propionate.

7. A method according to claim 5 wherein the essential active ingredient is ammonium $\alpha,\beta$-dichloro-$\beta$-phenyl-propionate.

8. A method according to claim 5 wherein the essential active ingredient is $\alpha,\beta$-dichloro-$\beta$-phenylpropionic acid.

* * * * *